US006746744B1

(12) United States Patent
Ishihara et al.

(10) Patent No.: US 6,746,744 B1
(45) Date of Patent: Jun. 8, 2004

(54) SEALING LABEL

(75) Inventors: Katsumasa Ishihara, Ichinomiya (JP); Eiji Funabashi, Ichinomiya (JP); Yoichi Kawashima, Osaka (JP); Junichi Tomiyama, Osaka (JP); Masayuki Date, Osaka (JP); Kikuko Yamanaka, Osaka (JP)

(73) Assignee: Santen Pharmaceutical Co., Ltd., Osaka (JP)

( * ) Notice: Subject to any disclaimer, the term of this patent is extended or adjusted under 35 U.S.C. 154(b) by 21 days.

(21) Appl. No.: 10/049,782

(22) PCT Filed: Aug. 14, 2000

(86) PCT No.: PCT/JP00/05459

§ 371 (c)(1),
(2), (4) Date: Jun. 13, 2002

(87) PCT Pub. No.: WO01/12518

PCT Pub. Date: Feb. 22, 2001

(30) Foreign Application Priority Data

Aug. 17, 1999 (JP) .......................................... 11/267597

(51) Int. Cl.[7] ................................................ B32B 3/10
(52) U.S. Cl. ......................................... 428/43; 428/136
(58) Field of Search .......................... 428/43, 343, 136; 215/246, 256, 253, 251

(56) References Cited

U.S. PATENT DOCUMENTS 4,577,771 A * 3/1986 Martinez .................... 215/256
4,678,094 A * 7/1987 Bullock ...................... 215/256
5,667,086 A * 9/1997 Guerre ....................... 215/256

FOREIGN PATENT DOCUMENTS

JP 9249254 9/1997
JP 1053261 2/1998

* cited by examiner

*Primary Examiner*—Alexander S. Thomas
(74) *Attorney, Agent, or Firm*—Webb Ziesenheim Logsdon Orkin & Hanson, P.C.

(57) ABSTRACT

For sealing a container (2) consisting of a barrel portion (3) and a cap portion (4) threaded and tightened on the barrel portion, the sealing label (1) includes a lower portion (1A) for substantially wrapping the barrel portion and an upper portion (1B) for substantially wrapping the cap portion. The sealing label includes horizontal perforations (10) consisting of cut segments (11) and uncut segments (12; 13) extending along a border between the upper portion and the lower portion; a knob portion (1*a*) disposed at an edge of the upper portion; and inclined perforations (20) consisting of cut segments (21) and uncut segments (22) extending obliquely in the upper portion from the knob portion to the horizontal perforations.

9 Claims, 4 Drawing Sheets

SEALING LABEL

This application is a national stage entry of PCT/JP00/05459 filed Aug. 14, 2000.

TECHNICAL FIELD

The present invention relates to a sealing label for sealing a container consisting of a barrel portion and a cap portion threaded and tightened on the barrel portion, the sealing label including a lower portion for substantially wrapping the barrel portion and an upper portion for substantially wrapping the cap portion. This sealing label is provided for identifying breaking of the seal or non-breaking of the seal and also for providing various data or information.

BACKGROUND ART

In a sealing label for a liquid container such as an eye dropper, if its horizontal perforations for breaking the sealing label is located upwardly of a shoulder of the barrel portion of the container, that is, upwardly of a border line between the barrel portion and the cap portion threaded and fastened to this barrel portion, liquid dripping during use of the container may be caught at the open gap between the lower portion of the sealing label which remains on the barrel portion after the breaking of the sealing label and the threaded portion, so that resultant accumulation dirt may present sanitary problem. For this reason, it is believed that the horizontal perforations should be located exactly at the shoulder of the barrel portion.

However, in such case too, in repeated use of the container after the breaking of the label, if the upper portion of the sealing label cut off the perforations remains at the lower region of the cap, this may give a user an uncomfortable feel. Therefore, it is preferred that the upper portion of the sealing label wrapping the cap portion can be easily removed after breaking of the seal.

A typical conventional sealing film includes horizontal perforations along the upper and lower portions of the sealing film and vertical perforations extending vertically in the upper portion. When the container sealed with this sealing film is used, as a first step, the vertical perforations extending vertically in the upper portion of the sealing film wrapping the cap portion is broken open by holding a knob portion. As a second step, the upper portion removed from the cap portion is peeled off along the horizontal perforations provided adjacent the border between the barrel portion and the cap portion. As a third step, the cap is turned to open up the container. In this case, the operation involving the first step of vertically cutting off the upper portion of the sealing film along the vertical perforations and the subsequent step of removing this upper portion along the horizontal perforations is a rather troublesome operation, which may result in damage in the lower portion during the vertical cutting operation. That is, since the horizontal perforations and the vertical perforations are provided perpendicular to each other, the vertical cutting operation cannot proceed smoothly into the horizontal cutting operation.

There has been also employed a sealing label made of a heat shrinkable synthetic resin and having an adhesive agent. With such sealing label, however, many of them have only the horizontal perforations. So, for breaking the seal, this is done by breaking the horizontal perforations by turning the cap. The label portion remaining on the cap will then have to be removed by pinching and forcibly pulling the exposed portion or cutting it by means of a cutter or the like.

At present, many containers on the market are sealed with the sealing label which is to be broken by one of the two method described above. However, a user tends to try to break the seal by the method that this user first experienced or the method which suits his/her feeling. With either method used, it is difficult to obtain satisfaction of all users, leaving either type of users dissatisfied.

In particular, in the case of containers such as eye droppers, it is desired that it allow clear distinction between the seal broken condition and the seal un-broken condition and also that it provide tamperproof function. However, in the case of the container sealed with the sealing label having only the horizontal perforations, after the seal is broken, if the cap is fastened again to its original position, sometimes the trace of the seal break cannot be visually judged, hence such sealing label is not suitable for tamperproof. In particular, in the case of e.g. a small eye dropper for medical treatment, the dropper is not put in a carton one by one, but a plurality of them are put in one carton. Hence, it is desired that the dropper gives clear and easy confirmation of seal-unbroken condition for each dropper. In the case of containers such as eye droppers, clear distinction between the seal broken condition and the seal un-broken condition and reliable tamperproof ability are desired.

DISCLOSURE OF THE INVENTION

An object of the present invention is to provide a sealing label which allows smooth transition from breaking of perforations in the upper area of the label to the horizontal perforations when the label is removed from the upper area thereof by holding a knob portion and which also allows easy distinction between the seal broken condition and the seal un-broken condition when the label is removed by breaking the horizontal perforations by turning the cap from the beginning.

For accomplishing the above-noted object, a sealing label for sealing a container consisting of a barrel portion and a cap portion threaded and tightened on the barrel portion, the sealing label including a lower portion for substantially wrapping the barrel portion and an upper portion for substantially wrapping the cap portion, wherein the sealing label includes horizontal perforations consisting of cut segments and uncut segments extending along a border between the upper portion and the lower portion; a knob portion disposed at an edge of the upper portion; and inclined perforations consisting of cut segments and uncut segments extending obliquely in the upper portion from the knob portion to the horizontal perforations.

With this construction, it is possible to break the seal by either breaking the perforations in the upper portion of the sealing label by holding the knob portion or breaking the horizontal perforations by turning the cap portion. Moreover, in the case of breaking the seal by holding the knob portion, since the perforations are inclined relative to the horizontal perforations, the transition to the breaking of the horizontal perforations may proceed smoothly. Further, in the case of breaking the seal by turning the cap, simultaneously with the breaking of the horizontal perforations, the breaking of the inclined perforations occurs, thereby to provide easy distinction between the seal broken condition and the seal un-broken condition. Needless to say, in the case of breaking the seal by breaking the horizontal perforations with holding the knob portion, the seal portion may be removed easily and completely, thus providing reliable tamperproof function.

According to a preferred embodiment of the present invention, as the extending shape of the inclined perforations, straight extending shape or downwardly convex curved extending shape is chosen for obtaing optimal breakability, although the shape will depend on e.g. the diameter of the cap or the pitch of the cut and uncut segments of the perforations.

According to one preferred embodiment of the present invention, the sealing label further includes additional perforations extending from the point of contact between the horizontal perforations and the inclined perforations for forming a V-shaped region with the inclined perforations. With this arrangement, when the gap is turned, the trace of the seal breakage in the form of a triangular region will be produced, which allows dear distinction between the seal broken condition and the seal un-broken condition at a glance, thus providing reliable tamperproof function. That is, when the cap is turned for breaking the seal, first, the breakage begins from that of the horizontal perforations. In this, due to the presence of V-shaped cut segment produced by the inclined perforations and the additional perforations at the contact area between the horizontal perforations and the inclined perforations, the inclined perforations will begin to break before the uncut segment of the horizontal perforations at this area is completely broken. Thereafter, in association with the rotation of the cap, the seal label portion between the horizontal perforations and the inclined perforations will be removed from the cap and the horizontal perforations will be broken accordingly. As a result, the triangular cutting line trace will always be produced, which allows distinction between the seal broken condition and the seal un-broken condition at a glance. The angle between the inclined perforations and the additional perforations, i.e. the angle of the V-shaped region, is preferably from 100 degrees to 160 degrees, more preferably about 120 degrees.

In order to obtain the above-described function/effect more effectively, according to one preferred embodiment of the present invention, the uncut segment of the horizontal perforations located at the contact area between the horizontal perforations and the inclined perforations is formed as an elongate uncut segment which has a greater length than that of the other uncut segments of the horizontal perforations. With this arrangement, when the seal is broken by turning the cap, the portion of the label contacting the portion of the horizontal perforations will resist breaking, so that the inclined perforations will begin to break in an efficient manner before the uncut segment of the horizontal perforations is completely broken. More preferably, the elongate uncut segment is disposed in contact with a cut segment of the inclined perforations.

Similarly, in order to obtain efficient breakage of the inclined perforations, it is also important that a length ratio of the cut segment relative to the uncut segment of the inclined perforations be greater than a length ration of the cut segment relative to the uncut segment of the horizontal perforations.

The lengths of the cut segment and uncut segment of the horizontal perforations and the inclined perforations will be appropriately determined, depending on e.g. the type of material forming the label, the size and intended use of the container, etc. Taking an eye dropper for example, the following lengths are employed normally.

For the horizontal perforations,.its cut segment has a length of 2 to 3 mm, preferably about 2.5 mm and its uncut segment has a length of 0.2 to 1 mm, preferably about 0.5 mm. And, the above-described uncut segment of the horizontal perforations at the contact area between the horizontal perforations and the inclined perforations, that is, the elongate uncut segment, has a length of 1.5 to 2.5 mm, preferably about 2 mm.

On the other hand, for the inclined perforations, its cut segment has a length of 3 to 4 mm, preferably about 3.5 mm and its uncut segment has a length of 0.2 to 1 mm, preferably about 0.5 mm. The additional perforations will have values similar to those of the inclined perforations and has 2 to 3 cut segments.

According to one preferred embodiment of the present invention, the sealing label is formed of heat shrinkable synthetic resin with an adhesive agent. With this, the adherence of the sealing label may be improved and also after the breakage of the seal, the lower portion of the sealing label will adhere to the container reliably, so that the various data or information required for the medical product or the like printed on this lower portion will not be lost inadvertently.

BEST MODE OF EMBODYING THE INVENTION

First Embodiment

A first embodiment of the present invention will be described with reference to FIGS. 1 through 5.

Figure 1:
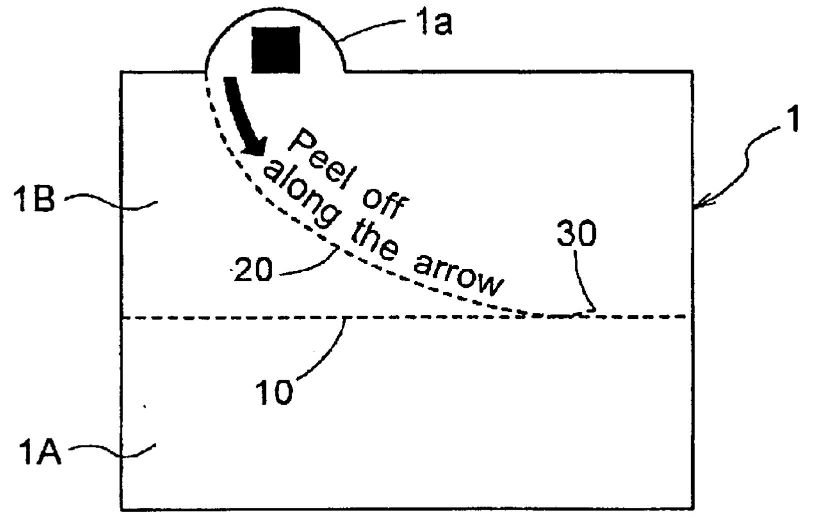
FIG. 1 a development of surface of a sealing label according to a first embodiment of the present invention, FIG. 2 an enlarged view showing a mode of horizontal perforations, inclined perforations and additional perforations of the sealing label shown in FIG. 1, FIG. 3 an enlarged view corresponding to FIG. 2 with the additional perforations being omitted therefrom, FIG. 4 a perspective view showing a container sealed with the sealing label of FIG. 1, FIG. 5 a perspective view showing a condition when the seal is to be broken by turning the cap of the container shown in FIG. 4, FIG. 6 a development of surface of a sealing label according to a second embodiment of the present invention, FIG. 7 a development of surface of a sealing label according to a third embodiment of the present invention, FIG. 8 a development of surface of a sealing label according to a fourth embodiment of the present invention, FIG. 9 a perspective view showing a container sealed with the sealing label according to the fourth embodiment of the present invention, and FIG. 10 a perspective view showing a condition trying to break the seal by turning the cap of the container shown in FIG. 9.

FIG. 1 is a development of a sealing label 1 according to the present invention. This sealing label 1 includes a lower portion 1A as the lower half and an upper portion 1B as the upper half, and the sealing label being formed of a heat shrinkable synthetic resin with an adhesive agent being applied to a desired portion in the back surface thereof, preferably in the back surface of the lower portion 1A. This sealing label 1 includes perforations as shown in FIGS. 2 or 3.

Figure 4:
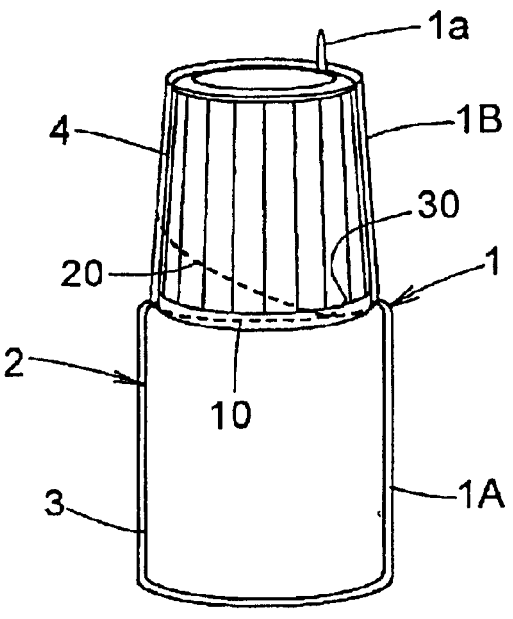

This sealing label 1 is for sealing a container 2 as shown in FIG. 4 consisting of a barrel portion 3 and a cap portion 4 threaded and fastened to a threaded portion provided at an upper region of the barrel portion 3. In doing so, the lower portion 1A of the sealing label 1 is to cover the barrel portion 3 and the upper portion 1B of the sealing label 1 is to cover the cap portion 4.

At the upper edge of the upper portion 1B of the sealing label 1, there is formed a knob portion 1*a* in the form of a tongue. The perforations formed in the sealing label 1 include horizontal perforations 10 consisting of cut segments 11 and uncut segments 12 extending along the border between the upper portion 1B and the lower portion 1A and inclined perforations 20 consisting of cut segments 21 and uncut segments 22 extending obliquely in the upper portion 1B from the knob portion 1*a* to the horizontal perforations 10. Thus, when tightly fitted to the container 2, the horizontal perforations 10 are to be located along the border between the barrel portion 3 and the cap portion 4 of the container 2.

Figure 2:
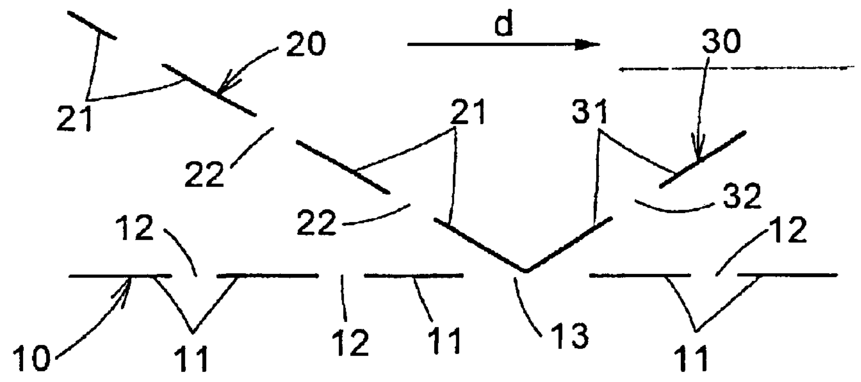
Figure 3:
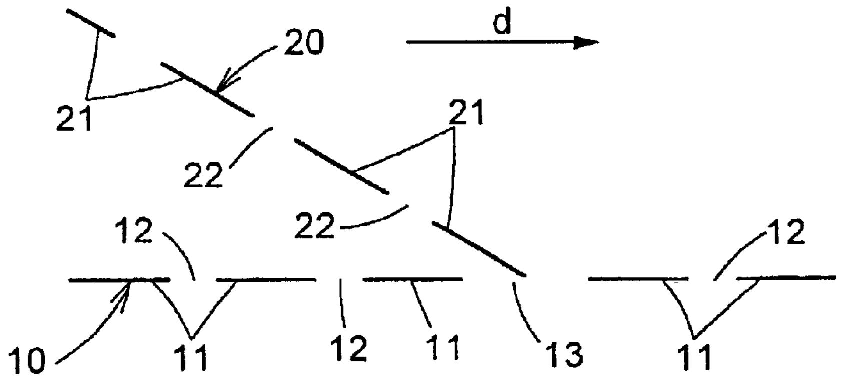

Further, in this embodiment, as best shown in FIG. 2, there are provided additional perforations 30 extending from a contact point between an elongate uncut segment 13 of the horizontal perforations 10 having a greater length than the other uncut segments 12 thereof and the cut segment 21 of the inclined perforations so as to form a V-shaped region with the inclined perforations 20, in mirror symmetry and with forming 120 degree angle relative to the inclined perforations. The additional perforations 30 have a length of one or two cut segments 31 and uncut segments 32.

The elongate uncut segment 13 of the horizontal perforations 10 forming the contact point area with the inclined perforations 20 has a length of about 2 mm. Whereas, the other uncut segments of the horizontal perforations 10 have a length of about 0.5 mm. Further, each cut segment 11 of the horizontal perforations 10 has a length of about 2.5 mm.

The inclined perforations 20 are provided in the form of downwardly convex curved perforations in the instant embodiment and its cut segment 21 has a length of about 3.5 mm and its uncut segment 22 has a length of about 0.5 mm, respectively.

Figure 5:
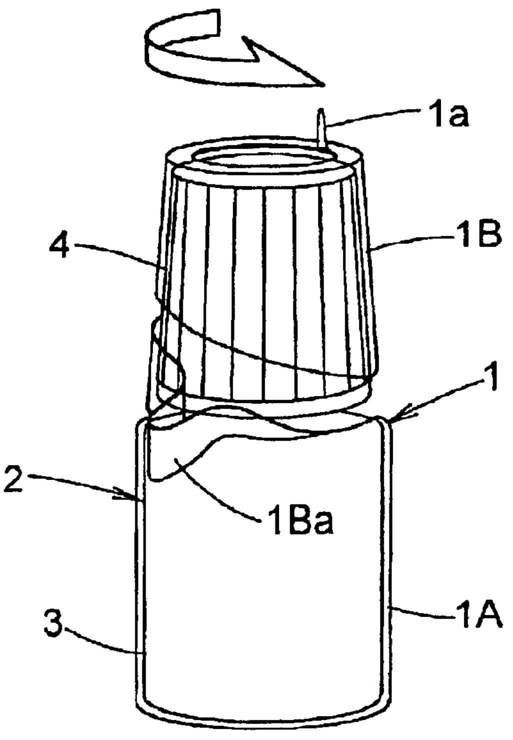

FIG. 4 shows an eye dropper 2 sealed with the sealing label 1 having the above-described construction. FIG. 5 illustrates a condition in which the seal is cut, i.e. broken, by turning the cap portion 4 of this eye dropper 2.

Incidentally, as may be apparent from FIGS. 4 and 5, the sealing label 1 affixed to the eye dropper 2 will be cut and broken by turning the cap portion 4 as described above. However, if the above-described additional perforations 30 are omitted (see FIG. 3), when the tuning of the cap 4 begins, the uncut segments 12 and the elongate segment 13 of the horizontal perforations 10 will be cut also. In this, however, as the inclined perforations 20 were heat shrunk to fit tightly to the cap portion 4, its uncut segments 22 will remain uncut. In this mode of embodiment, for removing the upper portion 1B of the sealing label 1, it is necessary to cut one by one the uncut segments 22 of the inclined perforations 20 by holding the knob portion 1*a*.

On the other hand, when the additional perforations 30 are provided, in association with the start of turning of the cap portion 4, due to a cushioning effect provided by the V-shaped cut portion formed by the two cut segments 21, 31 forming the crossing portion between the inclined perforations 20 and the additional perforations 30, the uncut segment 22 of the inclined perforations 20 will begin to be broken before the elongate uncut segment 13 is broken. So that, only a sealing label portion 1B*b* upwardly of the inclined perforations 20 will be rotated together with the turning cap 4. And, as the cap portion 4 is moved upward with further rotation thereof, as illustrated in FIG. 5, the inclined perforations 20 will be broken successively upwards and a sealing label portion 1B*a* downwardly of the inclined perforations 20 will become bent. In this manner, as the triangular portion 1B*a* separated in the above manner will be bent in a complex manner, this will provide dear trace of the seal broken event. At the same time, as such bent and curled portion cannot be easily restored, it also becomes impossible to restore the seal on purpose so as not to leave any trace of the seal broken event.

Second Embodiment

Next, a second embodiment of the present invention will be described with reference to FIG. 6.

Figure 6:
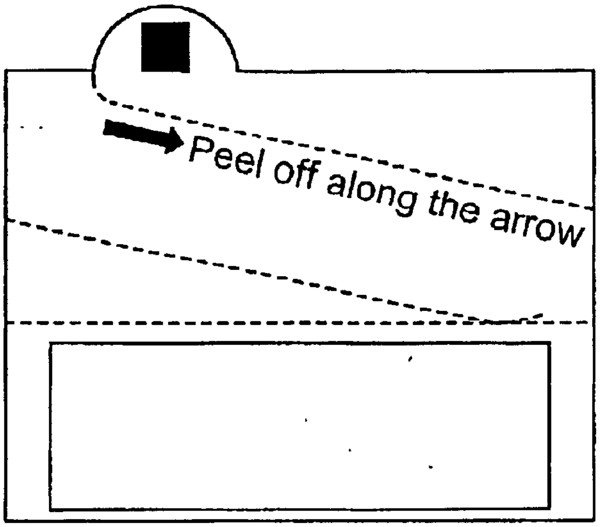

FIG. 6 is a development of a sealing label 1 according to the second embodiment of the present invention. In this sealing label 1, its inclined perforations 120 consists of two straight series of perorations which are to form a single continuous series of perforations when the label is wrapped around the container 2. In this respect, this embodiment differs from the foregoing embodiment.

Still Further Embodiments

Figure 7:
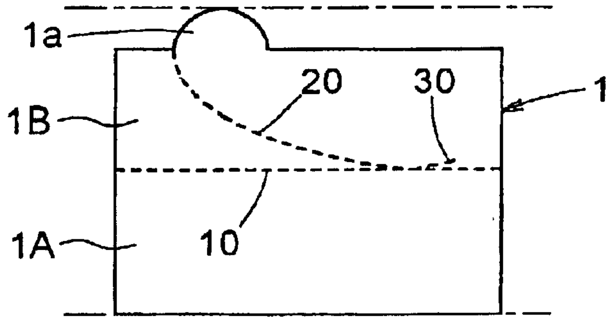

FIG. 7 is a development of a sealing label 1 according to a third embodiment of the present invention. This sealing label 1 has an upper portion 1B which is sized so that when the label is tightly fitted to the container 2 for sealing it, the leading end of the knob portion 1*a* will be located at substantially the top face edge of the cap portion 4.

Figure 8:
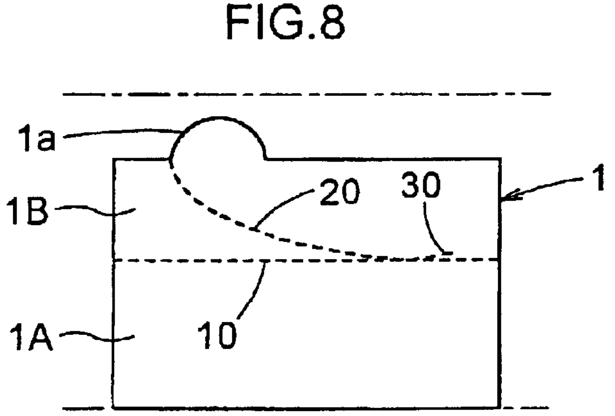

Further, FIG. 8 is a development of a sealing label 1 according to a fourth embodiment of the present invention. This sealing label 1 has an upper portion 1B which is sized so that when the label is tightly fitted to the container for sealing it, the leading end of the knob portion 1*a* will be located spaced apart by a predetermined distance from the top face edge of the cap portion 4.

In the case of an eye dropper, various data or information may sometimes be provided on the top face of the cap portion 4. Then, the third embodiment or fourth embodiment will be employed when it is necessary to prevent this display from being concealed by the sealing label. Further, by employing the construction with the knob portion 1*a* not projecting from the top face of the cap portion 4, this will achieve further effect of reducing the trouble of hooking of the knob portion 1*a* during a labeling step or a box packaging step in the manufacture process. Further, as the sealing label per se may be formed smaller, the material cost may be reduced as well.

Figure 9:
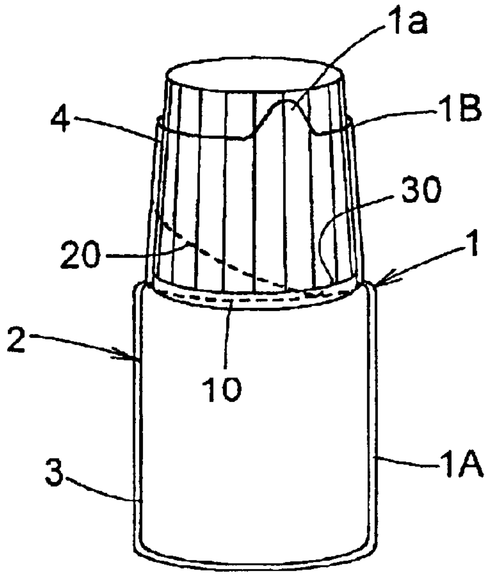
Figure 10:
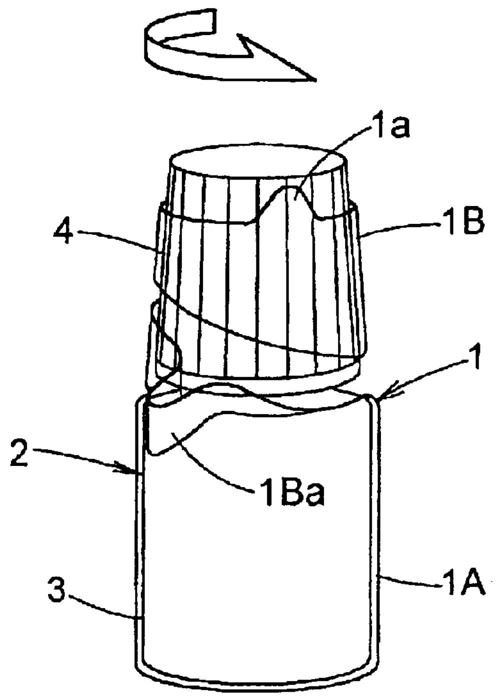

FIGS. 9 and 10 are a perspective view of the eye dropper 2 sealed with the sealing label according to the fourth embodiment and a perspective view illustrating a condition when an attempt has been made to break the seal by turning the cap portion 4 of this eye dropper 2, respectively.

INDUSTRIAL APPLICABILITY

When a user tries to break the sealing label 1 by holding the knob portion 1*a*, the sealing label 1 may be removed smoothly with a single action. Further, the sealing may be broken also only by turning the cap portion 4 of the container 2 sealed with this sealing label 1. In doing this, the triangular separated portion 1B*a* will always leave the curved trace which can be easily recognized and which cannot be restored, so that the tamperproof function is provided.

What is claimed is:

1. A sealing label for sealing a container consisting of a barrel portion and a cap portion threaded and tightened on the barrel portion, the sealing barrel including a lower portion for substantially wrapping the cap portion;

wherein the sealing label includes horizontal perforations consisting of cut segments and uncut segments extending along a border between the upper portion and the lower portion; a knob portion disposed at an edge of the upper portion; and inclined perforations consisting of cut segments and uncut segments extending obliquely in the upper portion from the knob portion to the horizontal perforations; and the uncut segment of the horizontal perforations located at the contact area between the horizontal perforations and the inclined perforations is formed as an elongate uncut segment which has a greater length than that of the other uncut segments of the horizontal perforations.

2. The sealing label according to claim 1, wherein the inclined perforations extend straight.

3. The sealing label according to claim 1, wherein the inclined perforations extend as a downwardly convex curve.

4. The sealing label according to claim 1, wherein a cut segment of the inclined perforations is tangential to the elongate uncut segment.

5. The sealing label according to claim 4, further comprising additional perforations extending from the point of contact between the horizontal perforation and the inclined perforations for forming a V-shaped region with the inclined perforations.

6. The sealing label according to claim 1, further comprising additional perforations extending from the point of contact between the horizontal perforations and the inclined perforations for forming a V-shaped region with the inclined perforations.

7. The sealing label according to claim 6, wherein a length ratio of the cut segment relative to the uncut segment of the inclined perforations is greater than a length ration of the cut segment relative to the uncut segment of the horizontal perforations.

8. The sealing label according to claim 7, wherein the sealing label is formed of heat shrinkable synthetic resin.

9. The sealing label according to claim 8, wherein an adhesive agent is applied to the back surface of the lower portion.

* * * * *

UNITED STATES PATENT AND TRADEMARK OFFICE

CERTIFICATE OF CORRECTION

PATENT NO. : 6,746,744 B1
DATED : June 8, 2004
INVENTOR(S) : Ishihara et al.

It is certified that error appears in the above-identified patent and that said Letters Patent is hereby corrected as shown below:

Column 8,
Line 11, "length ration" should read -- length ratio --.

Signed and Sealed this

Fourteenth Day of December, 2004

JON W. DUDAS
*Director of the United States Patent and Trademark Office*